(12) United States Patent
Ikegami et al.

(10) Patent No.: US 8,175,867 B2
(45) Date of Patent: May 8, 2012

(54) VOICE COMMUNICATION APPARATUS

(75) Inventors: Shinji Ikegami, Fukuoka (JP); Jyunichi Maehara, Fukuoka (JP); Noriaki Fukuoka, Fukuoka (JP); Toshihiro Tsukamoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 834 days.

(21) Appl. No.: 12/186,033

(22) Filed: Aug. 5, 2008

(65) Prior Publication Data

US 2009/0070105 A1 Mar. 12, 2009

(30) Foreign Application Priority Data

Aug. 6, 2007 (JP) ................ P2007-203910

(51) Int. Cl.
- *G10L 19/00* (2006.01)
- *G10L 21/00* (2006.01)
- *H04R 5/00* (2006.01)

(52) U.S. Cl. ............ 704/212; 704/200.1; 704/201; 704/230; 381/1; 381/17

(58) Field of Classification Search .......... 704/212, 704/224
See application file for complete search history.

(56) References Cited

U.S. PATENT DOCUMENTS

2007/0136073 A1 6/2007 Tashiro

FOREIGN PATENT DOCUMENTS

| JP | 2-001661 A | 1/1990 |
|---|---|---|
| JP | 8-037504 | 2/1996 |
| JP | 8-292799 A | 11/1996 |
| JP | 9-204742 A | 8/1997 |
| JP | 9-307513 | 11/1997 |
| JP | 2003-316670 A | 11/2003 |
| JP | 2005-077889 A | 3/2005 |
| JP | 2005-142757 | 6/2005 |

OTHER PUBLICATIONS

English language Abstract of JP 8-292799 A.
English language Abstract of JP 2-001661 A.
English language Abstract of JP 9-204742 A.
English language Abstract of JP 2003-316670 A.
English language Abstract of JP 2005-077889 A.

*Primary Examiner* — Justin Rider
(74) *Attorney, Agent, or Firm* — Greenblum & Bernstein, P.L.C.

(57) ABSTRACT

A voice communication apparatus includes a communication portion that receives a plurality of frames including at least a first frame having first voice data and a second frame having second voice data subsequent to the first frame, the first voice data and the second voice data being encoded by a predetermined encoding system, a decoding portion that decodes the first voice data and the second voice data received by the communication portion, a buffer that retains the first voice data and the second voice data decoded by the decoding portion, a calculation portion that calculates an amplitude envelope based on the first voice data decoded by the decoding portion, and a controlling portion that judges whether or not the second voice data decoded by the decoding portion exceeds the amplitude envelope and corrects the second voice data that exceeds the amplitude envelope.

11 Claims, 8 Drawing Sheets

TRANSMISSION SIDE
IP TELEPHONE SET

FIG. 8B

WHEN WAVEFORM IS
NORMALLY REPRODUCED
AFTER PACKET IS LOST

FIG. 8C

WHEN WAVEFORM IS
ABNORMALLY REPRODUCED
AFTER PACKET IS LOST

VOICE COMMUNICATION APPARATUS

BACKGROUND

The present invention relates to a voice communication apparatus for receiving voice data by the frame.

An IP telephone set has been known as one of a voice communication apparatus for receiving voice data, in which voices are encoded by a predetermined encoding system, frame by frame. In the IP telephone set, conversation is carried out between the transmission side and the receiving side by packets internally including one or more frames via a network such as the Internet.

In the network environment, loss of a frame that stores voice data occurs due to loss of a packet. Since the loss of the frame becomes a factor in the lowering of voice quality, in a general packet loss compensation (PLC), the lost frame is interpolated based on the voice data of the previous frame normally received.

If a Codec (coder/decoder) that is not influenced by the previous data as in G.711 Appendix I is available, data close to the original voice can be reproduced by using the loss compensation of the Codec.

However, since G.726 is influenced by the previous data, the interpolated lost frame becomes non-continuous to the voice data of a normally received frame thereafter. Therefore, when a normally received frame is decoded, the voice is made into an abnormal impulse-like sound, depending on voice data, and becomes a harsh grating noise to a receiver.

JP-A-8-292799 describes a method for preventing acoustic quality deterioration subsequent to a frame loss that becomes a factor for such a harsh grating noise, although the method relates to a mobile wireless device such as a digital cordless telephone.

JP-A-8-292799 describes an ADPCM encoded voice decoding method that decodes a correction code sequence with respect to the ADPCM (Adaptive Differential Pulse Code Modulation), which carries out correction using control and coded voices for making a predicted differential value small in regard to a part of the code sequence of a frame next to a lost frame.

However, in some lost frames, there are cases where the lost frames do not include abnormal impulse-like noise when encoding a normal frame next to a lost frame, and can have satisfactory reproducibility so as to be able to hear with normal sound quality. Therefore, if, as in the ADPCM encoded voice decoding method according to JP-A-8-292799, voice data is corrected in all cases regardless of whether or not there are abnormal impulse-like sounds in normal frames subsequent to lost frames, there is a fear that correction will inversely bring about acoustic deterioration in quality.

SUMMARY

Accordingly, it is an object of the present invention to provide a voice communication apparatus capable of attempting to improve acoustic quality by carrying out correction in compliance with the reproducibility of voice data of frames normally received after lost frames.

A voice communication apparatus according to the present invention comprises a communication portion that receives voice data which is encoded by a predetermined encoding system, frame by frame, a decoding portion that decodes the voice data, a buffer that retains the decoded voice data, a detection portion that detects a loss of the frames, a calculation portion that calculates the amplitude envelope in regard to waveforms of the decoded voice data, and a control portion that judges whether or not, where any frame is lost, voice data contained in a normal frame next to the lost frame exceeds the calculated amplitude envelope, and corrects the voice data so that the portions exceeding the amplitude envelope are fallen within the range of the amplitude envelope.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION

Figure 1:
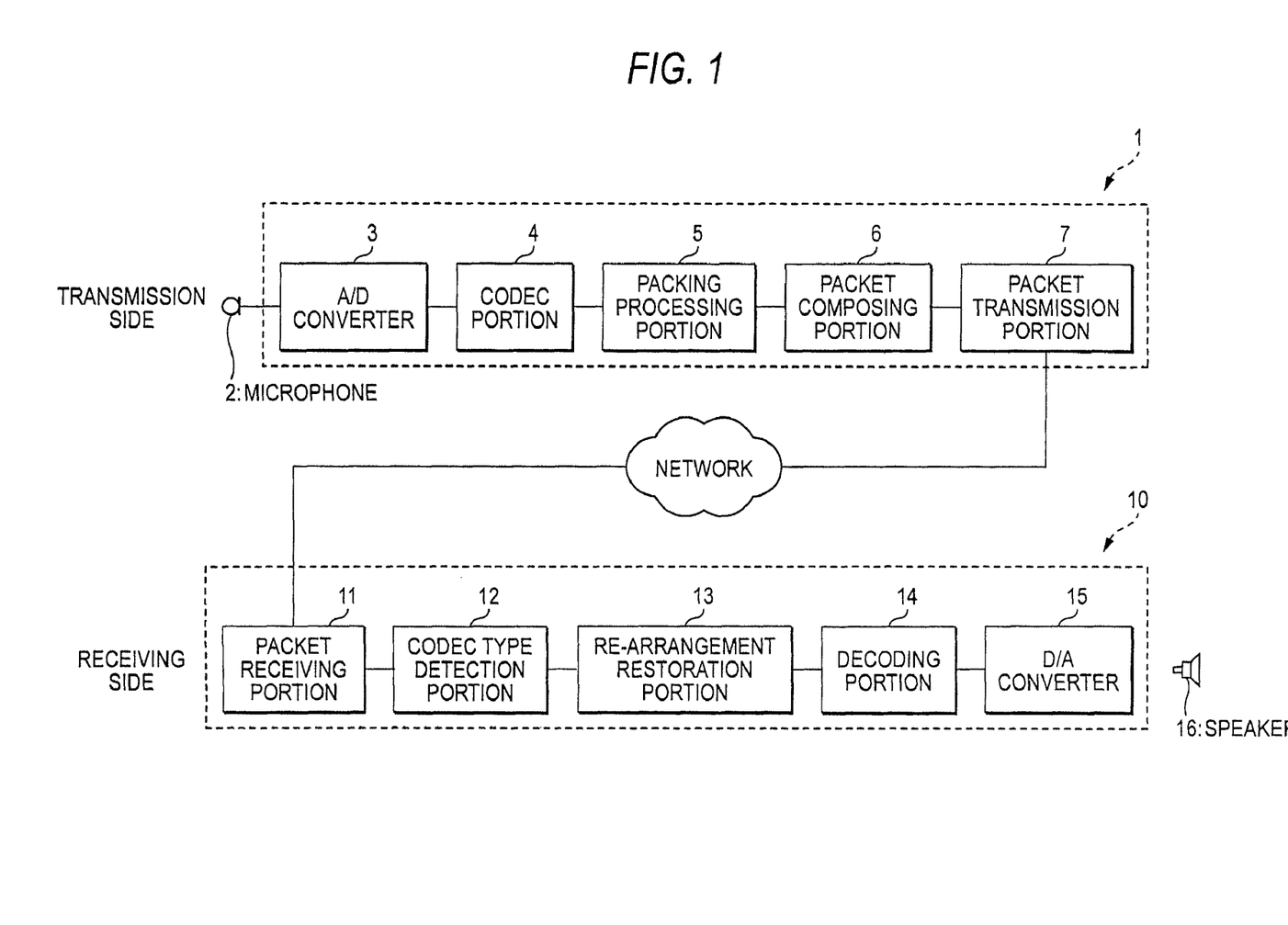
FIG. 1 is a view to describe a configuration of an IP telephone set according to an embodiment of the invention.
Figure 2:
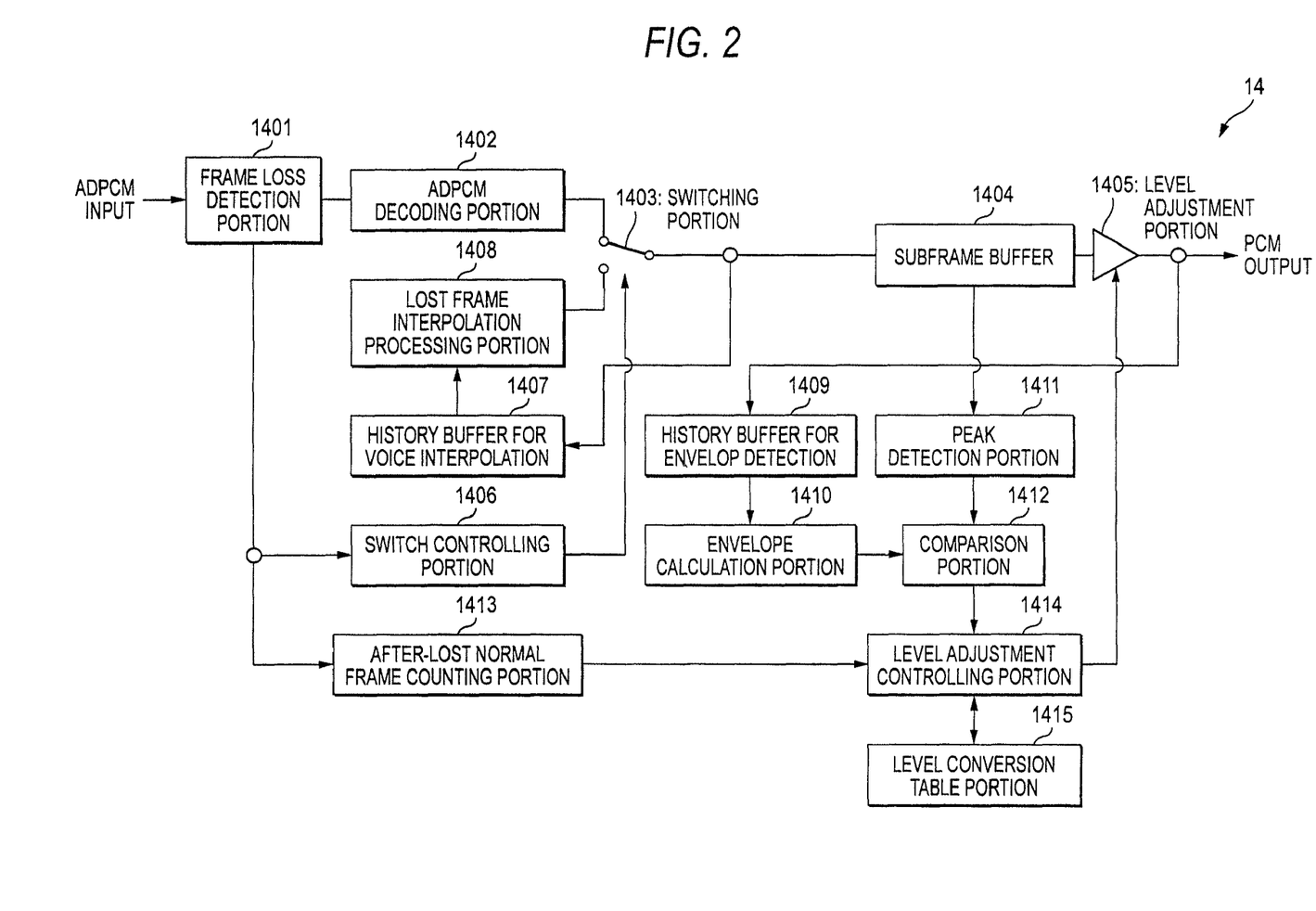
FIG. 2 is a view to describe a configuration of a decoding portion of the IP telephone set shown in FIG. 1.
Figure 3:
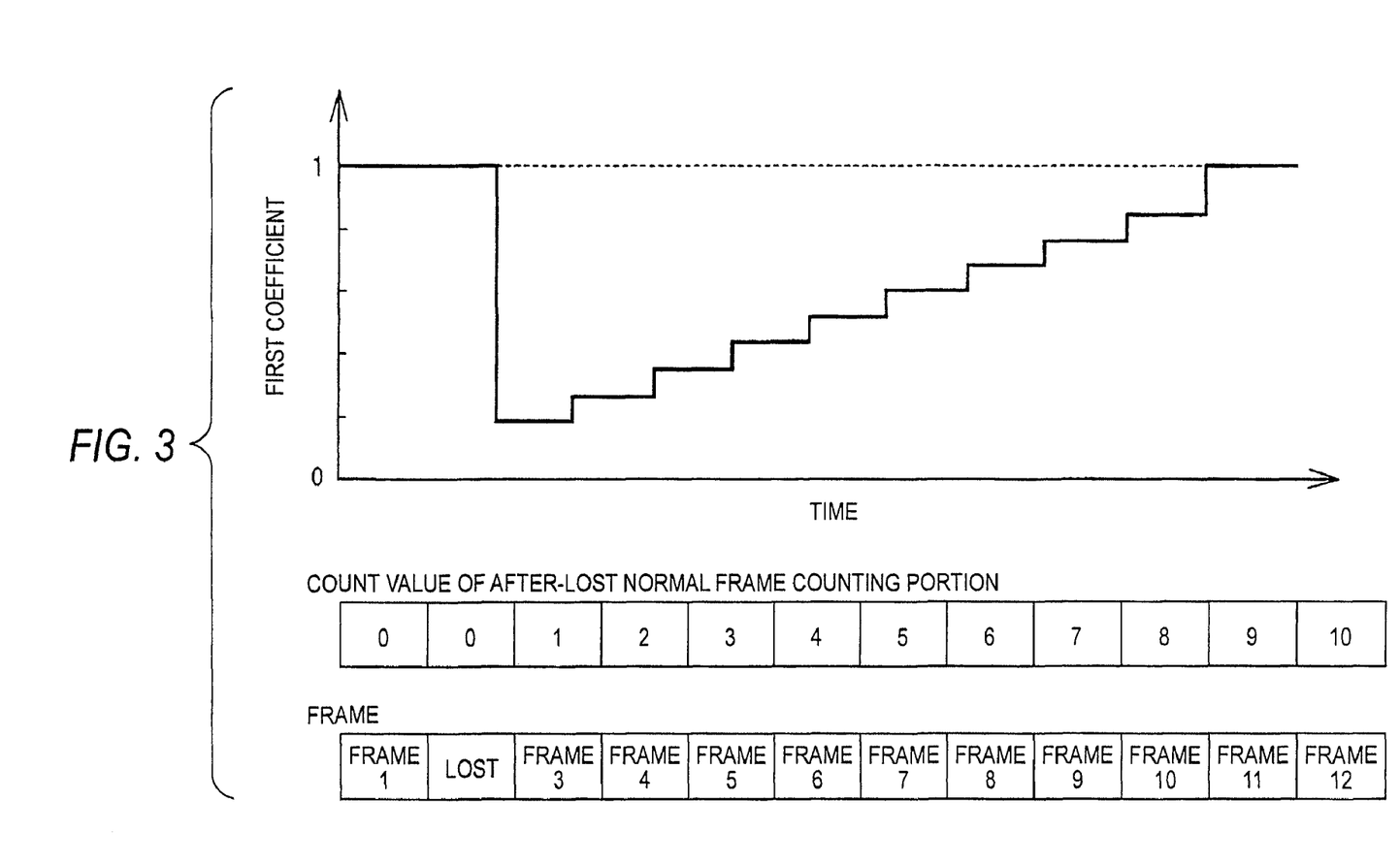
FIG. 3 is a view to describe a level conversion table of the IP telephone set shown in FIG. 1.

A description is given of a voice communication apparatus according to an embodiment of the invention, taking an IP telephone set as an example, with reference to the drawings. FIG. 1 is a view to describe the entire configuration of an IP telephone set according to the embodiment of the present invention. FIG. 2 is a view to describe the configuration of the decoding portion of the IP telephone set shown in FIG. 1. FIG. 3 is a view to describe a level conversion table of the IP telephone set shown in FIG. 1. Also, FIG. 1 shows only the transmission portion of the transmission side IP telephone set, and shows only the receiving portion of the receiving side IP telephone set.

As shown in FIG. 1, the receiving side IP telephone set 10 according to the embodiment is connected to a network such as the Internet and the Intranet, etc., and receives encoded voice data frame by frame from a transmission side IP telephone set 1 and decodes the same.

The transmission side IP telephone set 1 includes a microphone 2 in which voices are inputted and are converted to analog signals, an A/D converter 3 for converting the converted analog signals to digital signals, a Codec portion 4 that encodes the digital signals by a predetermined encoding system and compresses the same, a packing processing portion 5 that divides encoded voice data frame by frame, a packet composing portion 6 that adds a header (including a Codec type and a sequence number) to the framed voice data and turns the voice data into a packet, and a packet transmission portion 7 that transmits a packet to a network being a transmission line.

The Codec portion 4 encodes the inputted digital voice signals (G.711, G.726, G.729 etc.), and collectively makes the codes into a unit called payload. The size of the payload is not particularly regulated. However, if the payload is determined so as to collectively become 80 samples through 160 samples, where one sample is of 4 bits in terms of ADPCM encoding, by using a sampling frequency of 8 kHz as a detailed example, the time becomes 10 ms through 20 ms, and the data length becomes 40 bytes through 80 bytes. Next, the packet size is regulated. First, the size in which some payloads are collected and are made into a packet is determined in order to reduce the overhead of the packet itself. For example, if the data in the packet is 160 bytes, four payloads can be collected when the payload length is 40 bytes.

The packet composing portion 6 adds an RTP (Real-time Transport Protocol) header including a sequence number, a time stamp, and an encoding type (payload type) to voice data based on the generated voice data, and generates an RTP packet.

The receiving side IP telephone set 10 includes a packet receiving portion 11 for receiving packets from a network, a Codec type detection portion 12 for detecting the encoding system from the Codec type, a re-arrangement restoration portion 13 for re-arranging the packet sequence in order from the sequence numbers of the packets, a decoding portion 14 for decoding voice data of the frames internally included in the restored packets, a D/A converter 15 for converting decoded voice data to voice signals being analog signals, and a speaker 16 for outputting voices from the voice signals.

Next, a description is given of a configuration of the decoding portion 14 in the IP telephone set 10 at the receiving side based on FIG. 2.

As shown in FIG. 2, the decoding portion 14 decodes the voice data, carries out an interpolation process where any lost frame occurs, and at the same time, attempts to improve the acoustic quality by adjusting the level of frames subsequent to the lost frame.

In order to output frames, as they are, unless any lost frame occurs, and to generate a frame for interpolation of the lost frame if any lost frame occurs, the decoding portion 14 includes a frame loss detection portion 1401, an ADPCM decoding portion 1402, a switch portion 1403, a subframe buffer 1404, a level adjustment portion 1405, a change control portion 1406, a history buffer 1407 for voice interpolation, and a lost frame interpolation processing portion 1408.

Also, in order to prevent abnormal impulse-like sounds from occurring, which may be likely to occur in normal frames subsequent to a lost frame, the decoding portion 14 includes a history buffer 1409 for envelope detection, an envelope calculation portion 1410, a peak detection portion 1411, a comparison portion 1412, an after-lost normal frame counting portion 1413, a level adjustment control portion 1414, and a level conversion table portion 1415.

The frame loss detection portion 1401 detects loss of sequence numbers from the packet train in which the packet sequence is re-arranged in the order by the re-arrangement restoration portion 13, which is a detection portion for detecting whether or not there are any lost frames. In addition, in a case where re-arrangement of the packet sequence by the re-arrangement restoration portion 13 is not completed in a predetermined duration of time, the frame loss detection portion 1401 determines it to be as a loss of a frame.

The ADPCM decoding portion 1402 is provided with a function to decode encoded voice data. The ADPCM decoding portion 1402 is connected to the sub frame buffer 1404 with the switch portion 1403 intervened therebetween.

The sub frame buffer 1404 is a buffer memory for storing subframe data (voice data) in which frame data decoded by the ADPCM decoding portion 1402 is equally divided. Output signals from the subframe buffer 1404 are outputted as output signals of the decoding portion 14 via the level adjustment portion 1405.

The level adjustment portion 1405 adjusts the voice level outputted based on control from the level adjustment control portion 1414.

The history buffer 1409 for envelope detection is a buffer memory for sequentially storing the output signals of the level adjustment portion 1405.

The envelope calculation portion 1410 outputs a prediction threshold, which predicts the voice level of respective frames subsequent to a lost frame, by calculating the amplitude envelope (envelope curve) from the voice data stored in the history buffer 1409 for envelope detection.

The peak detection portion 1411 detects the peak value of voice data from the subframe buffer 1404. The comparison portion 1412 compares the prediction threshold from the envelope calculation portion 1410 with the peak value from the peak detection portion 1411 and outputs the result to the level adjustment control portion 1414.

The level adjustment control portion 1414 is provided with a function to adjust the voice level of voice data outputted from the level adjustment portion 1405. Although described in detail later, the voice level adjustment is carried out based on the first coefficient and the second coefficient to calculate the ratio for attenuation of voice level.

The after-lost normal frame counting portion 1413 counts the number of frames subsequent to a lost frame and outputs it to the level adjustment control portion 1414.

The level conversion table portion 1415 tabulates coefficients (hereinafter called the first coefficients) showing the degree of attenuation, corresponding to the count values of the after-lost normal frame counter portion 1413. With respect to the first coefficients, [1] means that no adjustment is required (that is, no attenuation occurred), and the smaller the coefficient becomes, the more the attenuation degree is intensified. For example, as shown in FIG. 3, in the first frame returned to a normal state (the count value of the after-lost normal frame counter portion 1413 is [1]), the attenuation degree is maximized. In the second coefficient and the third coefficient after returning to a normal state, the degree of attenuation is gradually decreased, and the first coefficient is set so as to be drawn near [1] where the count value of the after-lost normal frame counting portion 1413 is [10] and means that no adjustment is required.

Figure 4:
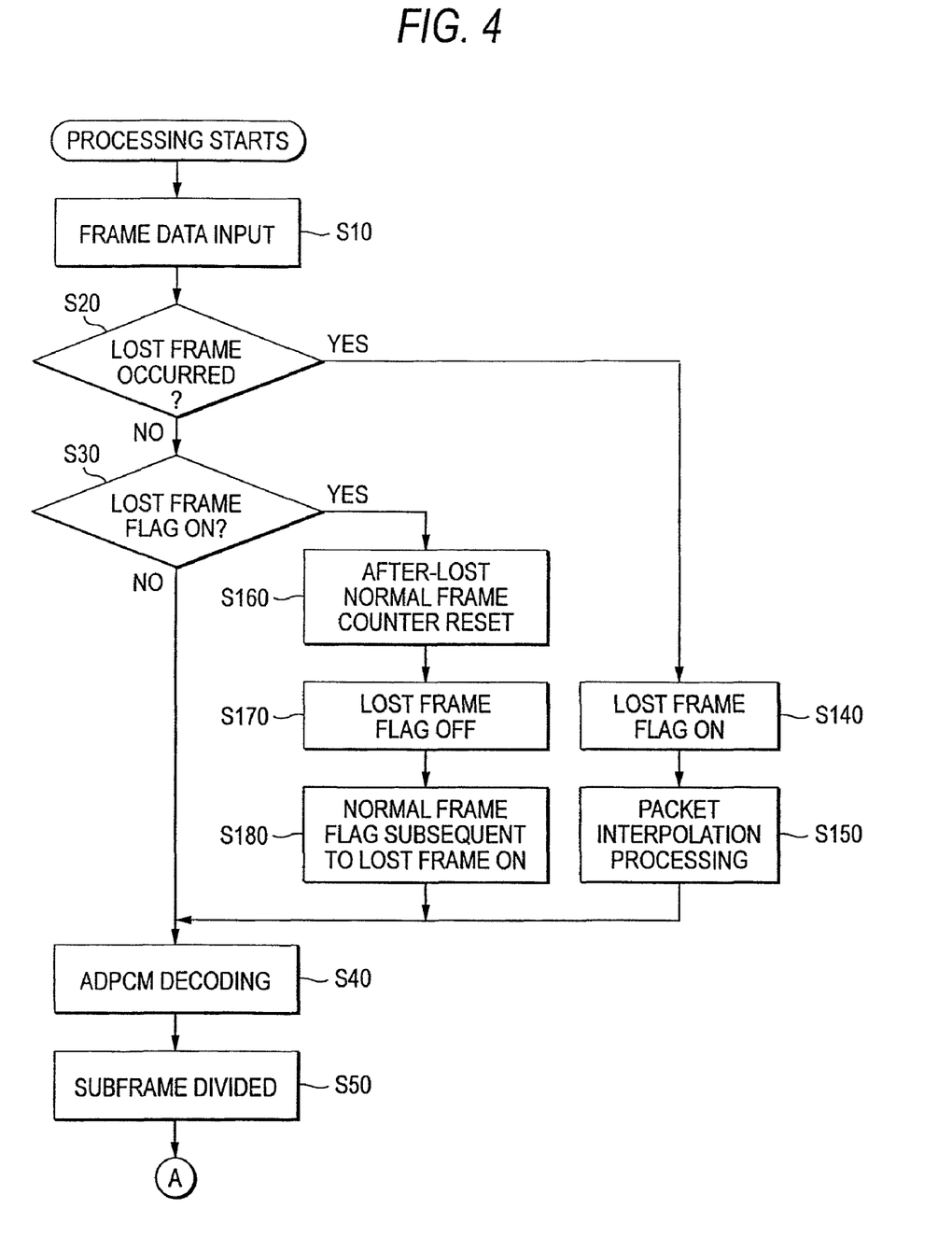
FIG. 4 is a flowchart to describe operations of the receiving side IP telephone set shown in FIG. 1.
Figure 5:
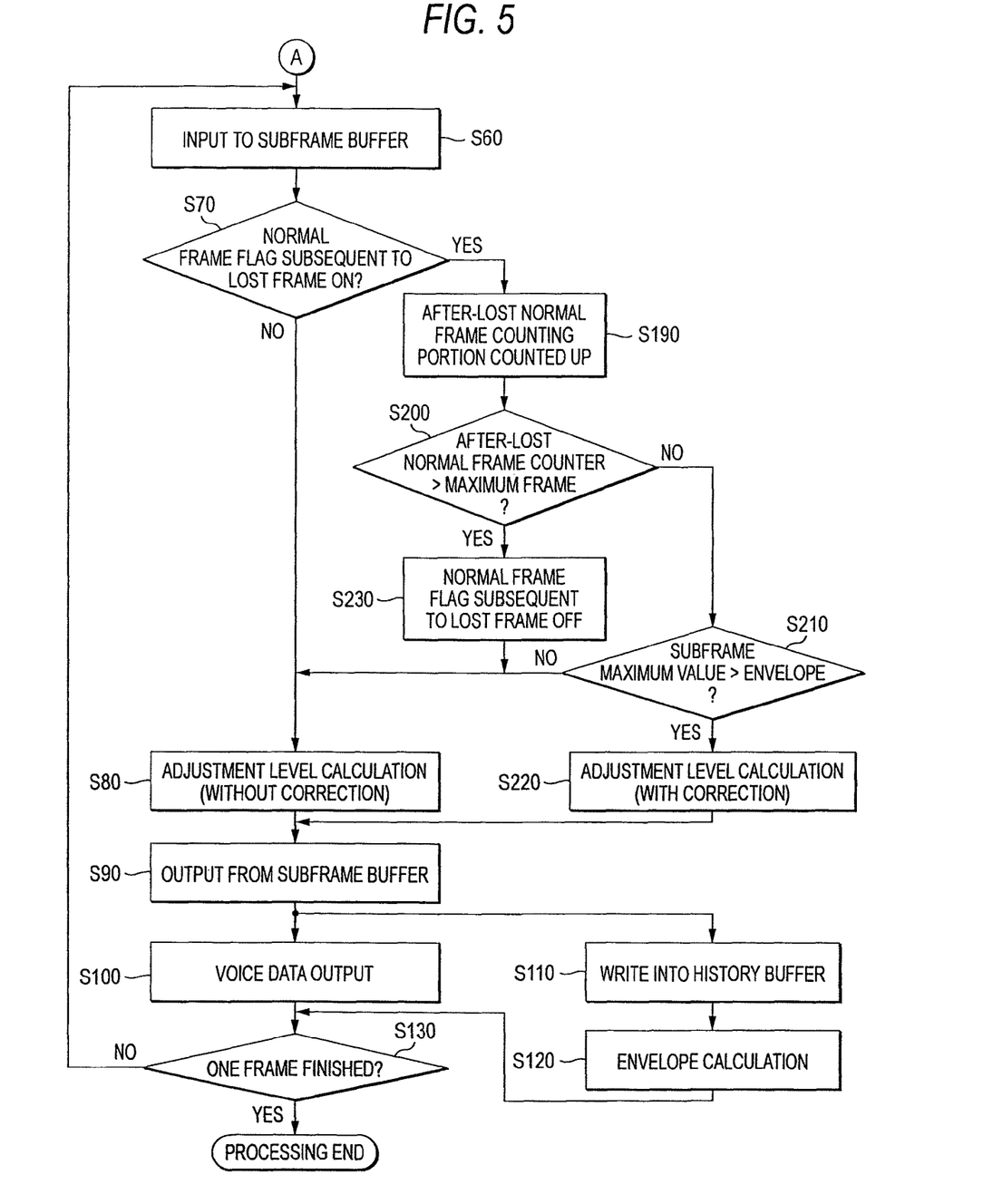
FIG. 5 is a flowchart to describe operations of the receiving side IP telephone set shown in FIG. 1.
Figure 6:
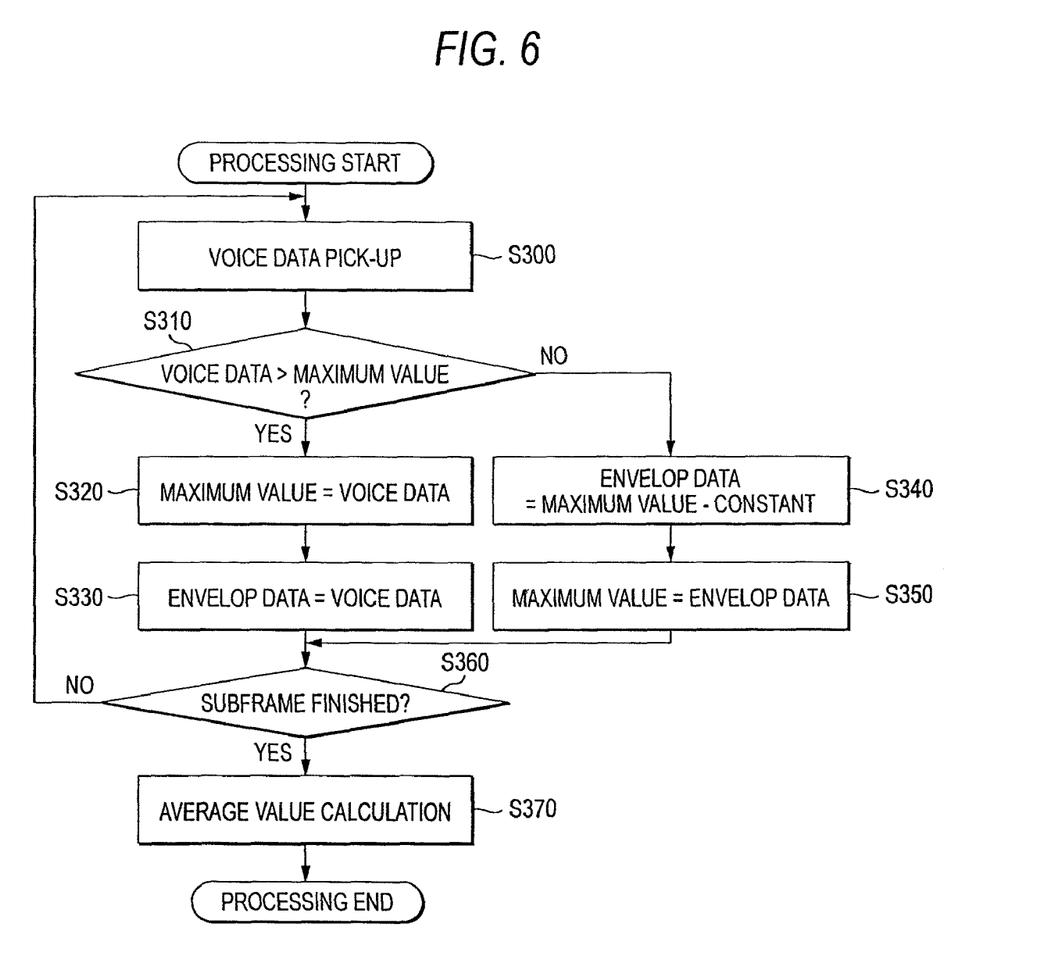
FIG. 6 is a flowchart to describe operations of an envelope calculation portion of the receiving side IP telephone set shown in FIG. 1.
Figure 7:
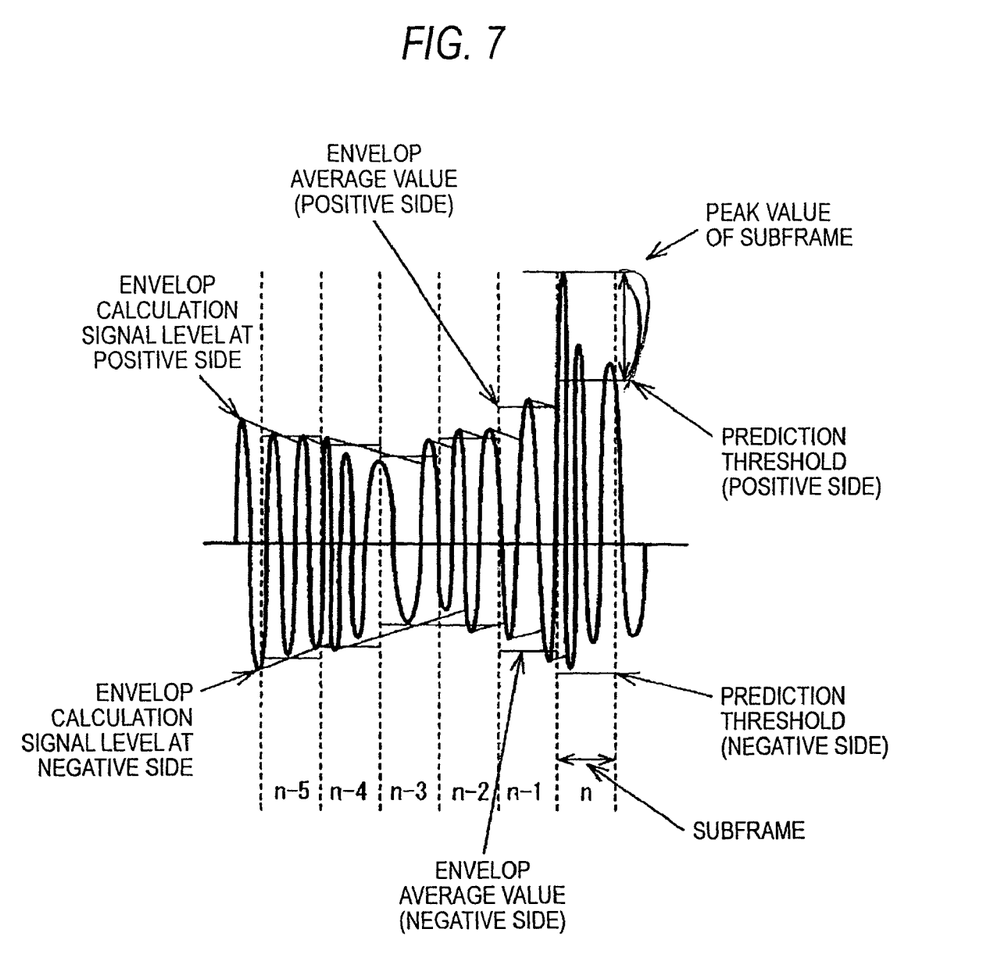
FIG. 7 is a waveform diagram to describe an amplitude envelope.

Based on FIG. 4 through FIG. 8, a description is further given of operations of an IP telephone set according to the embodiment of the present invention, which is constructed as described above. FIG. 4 and FIG. 5 are flowcharts to describe operations of the IP telephone set 10 at the receiving side, which is shown in FIG. 1. FIG. 6 is a flowchart to describe operations of the envelope calculation portion of the IP telephone set 10 at the receiving side, which is shown in FIG. 1. FIG. 7 is a waveform diagram to describe an amplitude envelope. FIG. 8A are views to describe abnormal impulse-like sounds when a lost frame occurs. FIG. 8A is a waveform diagram when being normal. FIG. 8B is a waveform diagram in a case where a normal frame subsequent to a lost frame is normally reproduced. FIG. 8C is a waveform diagram in a case where abnormal impulse-like sounds are included in a normal frame subsequent to a lost frame.

First, a description is given of a case where a packet from a transmission side IP telephone set 1 reached a receiving side IP telephone set 10 without being lost in the network.

As shown in FIG. 1, encoded voice data is transmitted from the transmission side IP telephone set 1 to the receiving side IP telephone set 10 packet by packet via the network.

The receiving side IP telephone set 10 receives packets by means of the packet receiving portion 11 and detects loss of sequence numbers of the packets in the arrival order by the re-arrangement restoration portion 13. And, when replacement of the sequence numbers in the arrival order is detected, the sequence numbers are re-arranged in the ascending sequence. The re-arrangement restoration portion 13 re-arranges the packets, and simultaneously picks up one or more frames internally included in the packet and outputs the same to the decoding portion 14.

As shown in FIG. 4, frame data being voice data is inputted from the re-arrangement restoration portion 13 into the decoding portion 14 (S10). The frame loss detection portion 1401 determines whether or not there is any lost frame (S20). Since occurrence of any lost frame is not detected in a state where no packet is lost, the frame loss detection portion 1401 instructs control of the switching portion 1403 to the switch controlling portion 1406 so that the subframe buffer 1404 and the ADPCM decoding portion 1402 are connected to each other. Also, the frame loss detection portion 1401 determines whether or not the lost frame flag showing whether or not any lost frame is detected is turned on (S30). If, in the determination, the lost frame flag is turned off, the process shifts to S40 without doing anything.

The frame data from the frame loss detection portion 1401 is outputted to the ADPCM decoding portion 1402, and is decoded by the ADPCM decoding portion 1402 (S40). In addition, the ADPCM decoding portion 1402 equally divides the decoded frame data subframe by subframe and generates the subframe data (S50).

As shown in FIG. 5, the divided subframe data is stored in the subframe buffer 1404, and simultaneously is stored in the history buffer 1407 for voice interpolation, which is used when a lost frame occurs (S60). Herein, the frame loss detection portion 1401 determines whether the after-lost frame flag is turned on or off (S70). Since the after-lost frame flag is turned off in a state where no packet is lost, a prevention process of abnormal impulse-like sounds, which is described in detail later, is not carried out. Therefore, [1] meaning that no adjustment is required is set (S80) as a result of calculation of the adjustment level, which calculates the degree of attenuation of voice data in the level adjustment controlling portion 1414. The voice data outputted from the subframe buffer 1404 is outputted to the level adjustment portion 1405 (S90).

Voice data outputted from the subframe buffer 1404 is caused to attenuate in compliance with the calculation result of the adjustment level by the level adjustment controlling portion 1414. However, since the calculation result of the adjustment level was [1] meaning that no adjustment is required, a process to prevent abnormal impulse-like sounds is not carried out, wherein voice data free from any correction is outputted to the D/A converter 15 shown in FIG. 1 via the level adjustment portion 1405 (S100).

Voice data outputted from the level adjustment portion 1405 in parallel is stored in the history buffer 1409 for envelope detection (S110). The reason why voice data is stored in the history buffer 1409 for envelope detection is to judge whether or not abnormal impulse-like sounds occur from the normally received voice data before occurrence of lost frames. Next, the envelope calculation portion 1410 carries out envelope calculation based on the voice data from the history buffer 1409 for envelope detection (S120).

Here, with reference to FIG. 6 and FIG. 7, a description is given of an envelope calculation carried out in S120 by the envelope calculation portion 1410.

As shown in FIG. 6, first, the envelope calculation portion 1410 picks up respective voice data of the subframes from the history buffer 1409 for envelope detection (S300). And, the voice data is compared with the maximum value included in the subframe sequentially in order of the first picked-up voice data (S310). Since the default value of the maximum value is [0], the first voice data is greater than the maximum value. Therefore, it is assumed that the first voice data is the maximum value (S320). And, the voice data is stored in the envelope calculation portion 1410 as the envelope data (S330).

In addition, since the maximum values are set for voice data on and after the second picked up voice data, the set maximum values are compared with the picked-up voice data. For example, where the voice data is greater than the maximum value, the process S320 may be carried out as described above, and at the same time, the process S330 is executed to turn the voice data into the envelope data.

Further, where the picked-up voice data is the maximum value or less, a difference of the constant (herein, an optional value may be adopted) from the maximum value is calculated, and the difference is stored in the envelope calculation portion 1410 as the envelope data (S340). And, the calculated envelope data is determined to be the maximum value (S350).

By repeating the processes from S300 through S350 for one subframe or equivalently with respect to both the positive side and the negative side, the respective envelope data is made into the positive side of the signal level and the negative side thereof with respect to the amplitude envelope shown in FIG. 7 (S360).

If the positive side of the signal level and the negative side thereof are calculated with respect to the amplitude envelope, the respective average values are calculated from the envelope data equivalent to one calculated subframe (S370). Accordingly, the average values at the positive side and the negative side of the amplitude envelope shown in FIG. 7 may be calculated, and in the subframe including abnormal impulse-like sounds, the average values become prediction thresholds (at the positive side and the negative side). Thus, the envelope calculation portion 1410 carries out envelope calculations based on the voice data.

As shown in FIG. 5, the ADPCM decoding portion 1402 determines whether or not all the subframe data has been outputted in the subframe buffer 1404. Resultantly, where there is remaining subframe data, the process is shifted to S60 (S130). Thus, the processes from S60 through S130 are repeated. Where the voice data for all of the subframe data is outputted, the process equivalent to one frame is finished.

Figure 8A:
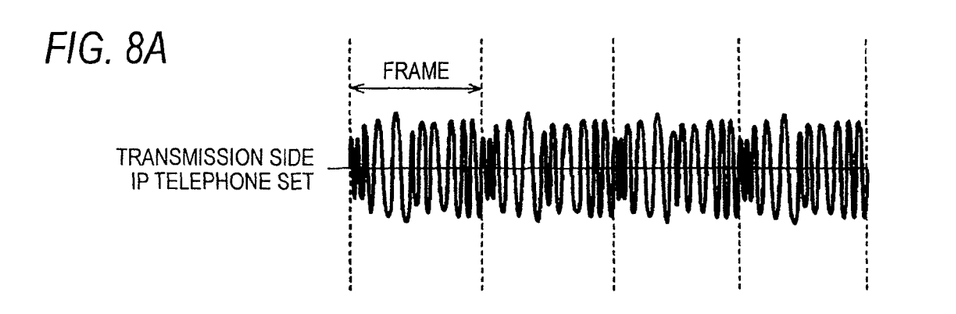
FIGS. 8A to 8C are views to describe abnormal impulse-like sounds when a lost frame occurs.
Figure 8B:
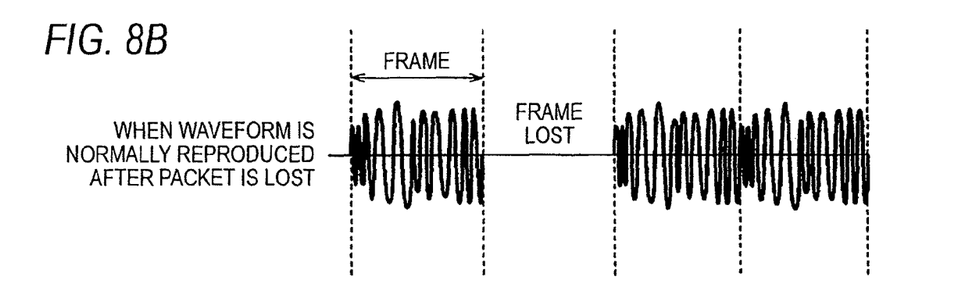
Figure 8C:
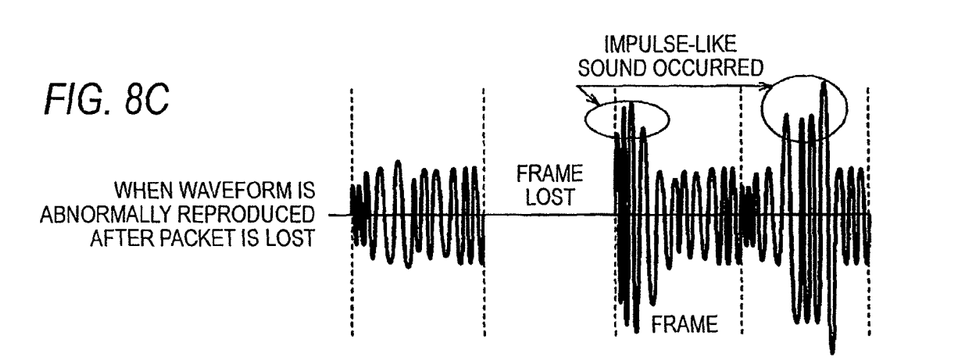

Next, a description is given of a case where, in the network, a packet is lost from the transmission side IP telephone set 1 and a lost frame occurs. Also, since the processes from the transmission side IP telephone set 1 to the re-arrangement restoration portion 13 of the receiving side IP telephone set 10 are the same as those in a case where no packet is lost, the description thereof is omitted.

Where the voice data transmitted from the transmission side IP telephone set 1 has, for example, a waveform as shown in FIG. 8A, if a lost frame occurs by the network, the frames are brought into non-continuity to the frame normally received thereafter. There are cases where a waveform is normally reproduced as shown in FIG. 8B, depending on some voice data. However, when normal frames subsequent to a lost frame are decoded, the normal frames may include abnormal impulse-like sounds as shown in FIG. 8C, wherein there are cases where a harsh grating noise is brought to a receiver. In this case, a process to prevent abnormal impulse-like sounds is carried out in the receiving side IP telephone set 10.

As shown in FIG. 4, if a packet from the transmission side IP telephone set 1 is lost to cause a lost frame to occur, the lost frame is detected (S10, S20) by the frame loss detection portion 1401 into which frame data is inputted from the re-arrangement restoration portion 13. If the lost frame is detected, the frame loss detection portion 1401 instructs the switch controlling portion 1406 to switch connection of the switching portion 1403 from the ADPCM decoding portion 1402 side to the lost frame interpolation processing portion 1408 side. In addition, the frame loss detection portion 1401 turns on the lost frame flag (S140).

By the connection of the switching portion 1403 being switched to the lost frame interpolation processing portion 1408 side, an interpolation process, which interpolates the lost frame based on the frame stored in the history buffer 1407 for voice interpolation and normally received before occurrence of the lost frame, is carried out by the lost frame interpolation processing portion 1408 (S150). And, the interpolated frame data is outputted to the subframe buffer 1404 via the switching portion 1403. The interpolation process by the lost frame interpolation processing portion 1408 may be carried out based on, for example, the regulation of G.711 Appendix I.

The interpolated frame data is decoded by the ADPCM decoding portion 1402 (S40). And, the decoded frame data is divided into subframes (S50). Hereinafter, since the lost frame becomes equivalent to normal frame data by interpolation, the processes from S60 to S130 shown in FIG. 5 are repeated for each of the subframes, and the results thereof are outputted to the D/A converter 15.

Next, a description is given of a case where the first frame subsequent to a lost frame is a normal frame.

When frame data is inputted (S10), the frame loss detection portion 1401 determines whether or not there is a lost frame (S20). If the first frame subsequent to the lost frame is a normal frame, the frame loss detection portion 1401 instructs the switch controlling portion 1406 to control the switching portion 1403 so that the subframe buffer 1404 and the ADPCM decoding portion 1402 are connected to each other, and the process shifts to S30.

In S30, the frame loss detection portion 1401 determines whether or not the lost frame flag is turned on. In this case, since the lost frame flag is turned on in S140 when having interpolated the lost frame, the frame loss detection portion 1401 first resets the after-lost normal frame counting portion 1413 (S160). Next, the lost frame flag is turned off (S170). And, the normal frame flag subsequent to the lost frame is turned on (S180).

The frame data coming from the frame loss detection portion 1401 subsequent to the lost frame is outputted to the ADPCM decoding portion 1402, and is decoded in the ADPCM decoding portion 1402 (S40). Also, the ADPCM decoding portion 1402 equally divides the decoded frame data for each of the subframes, and generates the subframe data (S50).

As shown in FIG. 5, the subframe data is stored in the subframe buffer 1404, and at the same time is stored in the history buffer 1407 for voice interpolation (S60). Next, the frame loss detection portion 1401 determines whether the after-lost frame flag is turned on or off (S70).

Here, since the frame loss detection portion 1401 turns on the normal frame flag subsequent to a lost frame in S180, the process shifts to S190. In S190, the frame loss detection portion 1401 instructs the after-lost normal frame counting portion 1413 to count up, and the counter value is turned from [0] to [1].

Although the count value of the after-lost normal frame counting portion 1413 is outputted to the level adjustment controlling portion 1414, the level adjustment controlling portion 1414 determines whether or not the count value exceeds the maximum frame subsequent to loss (S200). For example, since, in the level conversion table portion 1415 shown in FIG. 3, the first coefficient is determined to be a coefficient which is returned to an adjustment-free state when the count value is [10], the maximum frame is [9]. Therefore, in S200, it is determined that the count value does not exceed the maximum frame subsequent to loss.

If it is determined that the count value does not exceed the maximum frame subsequent to loss, next, the peak detection portion 1411 reads the voice data stored in S60 from the subframe buffer, detects the peak value and outputs it to the comparison portion 1412.

The comparison portion 1412 compares the peak value (the maximum value of the subframe) from the peak detection portion 1411 and the prediction threshold (envelope) from the envelope calculation portion 1410 with each other (S210).

In S210, where the peak value is greater than the prediction threshold, the level adjustment controlling portion 1414 carries out a calculation of the adjustment level to attenuate the voice level (S220). The calculation of adjustment level is carried out by multiplying the first coefficient by the second coefficient.

The first coefficient is determined by referring to the count value from the after-lost normal frame counting portion 1413 and the level conversion table portion 1415. That is, as shown in FIG. 3, since, with respect to the first coefficient, the count value of the after-lost normal frame counting portion 1413 is [1] in the normal frame subsequent to a lost frame, the degree of attenuation with respect to the frame is maximized.

The second coefficient is a value obtained by dividing a difference between the peak value detected by the peak detection portion 1411 and the prediction threshold from the envelope calculation portion by the maximum value at the positive side or the negative side. The maximum value at the positive side or the negative side becomes 32768 if it is, for example, a piece of data quantized by 16 bits. That is, if the voice data contained in the normal frame exceeds the average value at the positive side or the negative side of the amplitude envelope, the value obtained by calculating the ratio of the exceeding quantity becomes the second coefficient.

The voice data outputted from the subframe buffer 1404 is outputted to the level adjustment portion 1405 (S90). And, the voice data outputted from the subframe buffer 1404 is caused to attenuate based on the calculation result of adjustment level by the level adjustment controlling portion 1414. In this case, since the degree of attenuation obtained by calculation of adjustment level in S220 becomes a ratio obtained by multiplying the first coefficient by the second coefficient, the voice data including abnormal impulse-like sounds is corrected by the level adjustment portion 1405 so that the data is included within the range of the amplitude envelope, and is outputted to the D/A converter 15 shown in FIG. 1 (S100). Also, the corrected voice data is stored in the history buffer 1409 for envelope detection (S110).

Where it is determined in S210 that the peak value is the prediction threshold or less, it is not necessary to carry out a prevention process of abnormal impulse-like sounds by the level adjustment controlling portion 1414. Therefore, the process shifts to S80, and voice data that is in a correction-free state is outputted.

And, it is determined in S130 whether or not all of the subframe data is outputted to the subframe buffer 1404. As a result, if there is remaining subframe data, the process again shifts to S60. If there is no remaining subframe data, the process is terminated.

Thus, since, in normal frames subsequent to lost frames, the peak value is determined for each of the subframes obtained by dividing one frame into a plurality, it is possible to determine, at high accuracy, whether or not abnormal impulse-like sounds are included. Therefore, since correction is carried out only when it is determined that the voice data includes abnormal impulse-like sounds, reproducibility of the voice data is high.

Thereafter, in normal frames on and after the second frame after a lost frame has occurred, it is determined in S20 that there is no lost frame, it is determined in S30 that the lost frame flag is turned off, it is determined in S70 that the normal frame flag subsequent to a lost frame is turned on, and it is determined in S210 that the peak value is greater than the prediction threshold. Therefore, if it is determined that the voice data similarly includes abnormal impulse-like sounds, a process for preventing abnormal impulse-like sounds is carried out in S220. However, a point that is different from the normal frame immediately after a lost frame has occurred is in that the degree of attenuation differs, depending on how many frames the frame including abnormal impulse-like sounds pass after the lost frame. This is because, as shown in FIG. 3, the first coefficient differs in compliance with the count value of the after-lost normal frame counting portion 1413 for counting normal frames subsequent to the lost frame.

Therefore, in calculation of adjustment level to calculate the degree of correction of the voice level in S220, such a level is adopted, which is obtained by multiplying the first coefficient for which the degree of attenuation is gradually lightened frame by frame and the second coefficient in response to the peak value by the voice level.

And, in the present embodiment, as shown in FIG. 3, since the first coefficient is a coefficient which is returned to an adjustment-free state when the count value of the after-lost normal frame counting portion 1413 is [10], the maximum frame is [9]. Therefore, at the tenth frame since a lost frame occurs, it is determined in S200 that the count value exceeds the maximum frame subsequent to the loss. That is, since abnormal impulse-like sounds are regarded as normal voice data if exceeding the maximum frame, correction-free. voice data is outputted by shifting to S80 after the normal frame flag subsequent to the lost frame is turned off (S230). Further, by the normal frame flag subsequent to the lost frame being turned off in S230, no prevention process of abnormal impulse-like sounds is carried out after the 11$^{th}$ frame by determination in S70, and the process shifts to S80.

Thus, where, in the receiving side IP telephone set 10, where reproducibility deteriorates, for example, the peak value of subframes in a normal frame subsequent to the lost frame is greater than the prediction threshold, the voice data is made into corrected voice data for which a prevention process of abnormal impulse-like sounds is carried out if within the range of the maximum frame, and where reproducibility is satisfactory, for example, the peak value is the prediction threshold or less, the voice data is made into correction-free voice data even if within the range of the maximum frame. Accordingly, it is possible to obtain voices free from a sense of discomfort, wherein it is possible to further attempt to improve the acoustic quality.

A description was given of the embodiment of the present invention. However, the present invention is not limited to the above-described embodiment. For example, in the present embodiment, the level conversion table portion 1415 is set to [1] meaning that no adjustment is required, when the count value of the after-lost normal frame counting portion 1413 becomes [10]. However, the count value may be another value, for example, [3]. The count value may change in compliance with the encoding system. Therefore, it is preferable that the count value is appropriately determined in compliance with the situations.

In addition, a description was given of an IP telephone set as a voice communication apparatus. However, the present invention may be applicable to similar transmission procedures in, for example, a cordless telephone set and a mobile telephone set which carry out wireless communications.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-203910 filed on Aug. 6, 2007, the contents of which are incorporated herein for reference.

What is claimed is:

1. A voice communication apparatus, comprising:
   a communication portion that receives a plurality of frames including at least a first frame having first voice data and a second frame having second voice data subsequent to the first frame, the first voice data and the second voice data being encoded by a predetermined encoding system;
   a decoding portion that decodes the first voice data and the second voice data received by the communication portion;
   a buffer that retains the first voice data and the second voice data decoded by the decoding portion;
   a calculation portion that calculates an amplitude envelope based on the first voice data decoded by the decoding portion; and
   a controlling portion that judges whether or not the second voice data decoded by the decoding portion exceeds the amplitude envelope and corrects the second voice data that exceeds the amplitude envelope.

2. The voice communication apparatus according to claim 1, further comprising:
   a detection portion that detects a loss of a frame among the plurality of frames received by the communication portion,
   wherein when the detection portion detects the loss of the frame, the controlling portion judges whether or not the second voice data contained in a normal frame subsequent to the lost frame exceeds the amplitude envelope, and corrects the second voice data that exceeds the amplitude envelope.

3. The voice communication apparatus according to claim 2, further comprising:
   an interpolation processing portion that interpolates the lost frame.

4. The voice communication apparatus according to claim 3, wherein the calculation portion that calculates the amplitude envelope based on voice data contained in the interpolated lost frame in addition to the first voice data.

5. The voice communication apparatus according to claim 2, wherein the controlling portion judges whether or not, with respect to a predetermined number of normal frames subsequent to the lost frame, the second voice data contained in the normal frames exceeds the amplitude envelope.

6. The voice communication apparatus according to claim 2, wherein the controlling portion does not carry out any correction of the second voice data when it is judged that the second voice data contained in a predetermined number of frames subsequent to the loss of the frame does not exceed the amplitude envelope, and outputs the first voice data and the second voice data retained in the buffer.

7. The voice communication apparatus according to claim 1, wherein the controlling portion judges whether or not respective second voice data contained in each of the frame units obtained by dividing the frame exceed the amplitude envelope.

8. The voice communication apparatus according to claim 1, wherein the calculation portion includes a history buffer for storing the decoded first voice data and second voice data sequentially; and wherein the calculation portion calculates, as a prediction threshold, the amplitude envelope based on the first voice data and the second voice data stored in the history buffer.

9. The voice communication apparatus according to claim 1, further comprising:

a peak detection portion that detects respective peak values of the first voice data and the second voice data outputted from the buffer, wherein the controlling portion compares the peak values of the detected first voice data and second voice data with the prediction threshold of the amplitude envelope, respectively, and corrects the second voice data based on the comparison result.

10. The voice communication apparatus according to claim 1, wherein the controlling portion calculates a ratio of attenuating the voice data by multiplying a first coefficient showing the degree of attenuation of the second voice data by a second coefficient showing a value obtained by dividing a differential between the peak value of the second voice data and the value of the amplitude envelope by the maximum value or the minimum value of the amplitude envelope, and the controlling portion attenuates the second voice data based on the calculated ratio.

11. The voice communication apparatus according to claim 1, wherein the predetermined encoding system is an ADPCM system.

* * * * *